PARAMETRIC FREQUENCY CONVERTERS

Filed April 18, 1962 3 Sheets-Sheet 1

INVENTORS:
LEOPOLD A. HARWOOD &
TOMOMI MURAKAMI
BY Eugene M. Whitacre
Attorney

PARAMETRIC FREQUENCY CONVERTERS

Filed April 18, 1962 3 Sheets-Sheet 2

INVENTORS
LEOPOLD A. HARWOOD & TOMOMI MURAKAMI

BY Eugene M. Whitacre
ATTORNEY

PARAMETRIC FREQUENCY CONVERTERS

Filed April 18, 1962 3 Sheets-Sheet 3

INVENTORS
LEOPOLD A. HARWOOD &
TOMOMI MURAKAMI
BY
Eugene M. Whitacre
Attorney 3,226,645

PARAMETRIC FREQUENCY CONVERTERS

Leopold A. Harwood and Tomomi Murakami, Haddonfield, N.J., assignors to Radio Corporation of America, a corporation of Delaware Filed Apr. 18, 1962, Ser. No. 188,476
5 Claims. (Cl. 325—445)

This invention relates to frequency converters and more particularly relates to frequency converting structures adapted to utilize a nonlinear device as the mixing element thereof.

Frequency converters, which utilize a nonlinear variable reactance device as the mixing element thereof, have been termed parametric converters. In their simplest form, parametric converters comprise a nonlinear variable reactance device to which are coupled a source of signals and a pump oscillator by means of their associated resonant circuits, tuned respectively to the frequency of an input signal to be converted and the frequency of a pump oscillator signal. Additionally, another resonant circuit, the idler circuit, is coupled to the nonlinear variable reactance device to derive an output idler signal having a frequency corresponding to one of the sidebands produced by the interaction of the input signal and the pump oscillator signal in the nonlinear reactance device. When the idler circuit is tuned to the difference between the frequencies of the input and pump oscillator signals, the parametric converter is said to operate in the difference mode, whereas when tuned to the sum of these frequencies, the parametric converter operates in the sum mode. When parametric converters are operated in the sum mode, a positive resistance is effectively introduced into both the input signal circuit and the pump oscillator circuit. When operated in the difference mode, a positive resistance is introduced into the pump oscillator circuit but a negative resistance is effectively introduced into the input signal circuit. The former type of operation is stable, while the latter type of operation may become unstable and break into spurious oscillations if the input circuit resistance across the effective negative resistance is not carefully controlled.

If the frequency of the idler output signal is greater than the frequency of the input signal, the parametric converter functions as an up-converter whereas if the idler signal frequency is less than the input signal frequency, the parametric converter functions as a down-converter.

Conversion gain, i.e. signal amplification as well as signal frequency conversion, and low noise operation may be achieved in a parametric converter. The conditions for conversion gain have been set forth in an article by J. M. Manley and H. E. Rowe in the July 1956 issue of the Proceedings of the IRE. In this article, it is specified that when two signals of different frequencies are applied to a nonlinear variable reactance device more power is supplied to the variable reactance device, and hence to the mixed output signal, by the signal at the higher frequency than by the signal at the lower frequency. Thus, parametric converters are operated with a pump oscillator signal at a frequency higher than the frequency of an input signal, in order to provide an output idler signal exhibiting conversion gain.

In the sum mode type of operation, the maximum available gain of a parametric converter is equal to the ratio of the frequency of the idler output signal to the frequency of the input signal. Therefore, high pump oscillator signal frequencies relative to input signal frequencies are utilized to provide high conversion gains.

Since signal currents of at least three different frequencies, namely the input signal, the pump oscillator signal and the idler output signal frequencies, flow through the nonlinear reactance device, the reactance device functions as a common coupling element between the various resonant circuits for these signals. Such coupling between the various resonant circuits may present serious problems when a parametric converter is made tunable over a band of frequencies. If the resonant circuits are not decoupled from each other, the tuning of one resonant circuit detunes the other resonont circuits which, when returned, in turn detune the first one resonant circuit. To avoid such tuning problems, many prior art circuits utilize devices, such as isolators, to decouple the resonant circuits from each other. Such prior art circuits are expensive and bulky and not well suited for use in tuners such as those in television receivers.

Another problem in parametric converters is due to the low Q (quality factor) which is exhibited at high frequencies by nonlinear reactance devices such as presently available variable-capacitance diodes. Such diodes when shunted across a high frequency resonant circuit, such as a cavity resonator, load the circuit so much that the selectivity of the parametric converter is destroyed and the gain is drastically reduced.

Accordingly it is an object of this invention to provide an improved frequency converter structure which is compact and simple in construction.

It is another object of this invention to provide an improved frequency converter structure which is compact in construction and adapted for use as a parametric converter.

It is still another object of this invention to provide an improved frequency converter structure which provides substantial isolation between the various signal sources connected thereto.

It is a further object of this invention to provide an improved parametric converter structure which provides optimum coupling between a nonlinear variable reactance device and the various resonant circuits thereof.

It is still a further object of this invention to provide an improved parametric converter structure which permits the various signal sources coupled thereto to be tuned over a range of frequencies without having adverse effects on conversion gain.

It is still a further object of this invention to provide a parametric tuner which is suitable for use as a tuner in a television receiver.

A frequency converter in accordance with the invention, includes a chassis compartment made of a conductive material. A conductive partition, or septum, is mounted within the chassis compartment to separate the compartment into a first cavity resonator, resonant at the frequency of a pump oscillator signal, and a second cavity resonator, resonant at the frequency of an idler output signal. The conductive septum includes a slot, or iris, in which a nonlinear device, such as a variable-capacitance diode, is mounted. The variable capacitance diode is coupled, as well as matched, to both cavity resonators but the conductive septum substantially isolates and decouples the first and second cavity resonators from each other.

The variable capacitance diode is mounted in the iris in a manner such that one electrode thereof is directly connected to the top of the chassis compartment while the other electrode is electrically coupled to the bottom of the chassis compartment through a capacitor. The capacitor exhibits a substantial reactance at input signal frequencies but a low reactance at pump oscillator signal and idler signal frequencies. The exact manner of mounting the diode in the chassis compartment will be described more fully subsequently.

A source of signals, at a frequency $f_s$, is coupled across the capacitor to apply input signals to the variable capacitance diode. A pump oscillator is coupled to the first cavity resonator, to apply oscillatory signals to the variable capacitance diode. Tuning means are included in the first cavity resonator to tune the pump oscillator signal to a frequency $f_p$, which is substantially higher than the frequency of the input signal, $f_s$. An idler output signal, produced by the interaction of the input signal and the pump oscillator signal in the nonlinear capacitance of the diode is developed in the second or idler circuit cavity resonator. The idler cavity resonator may be tuned to a frequency $f_i$ equal to either the sum of, or the difference between, the input signal frequency and the pump oscillator frequency, i.e. $f_i=f_p \pm f_s$. The idler output signal is coupled from the second cavity resonator.

In another embodiment of the invention, a multiple number of conductive chassis compartments are connected together to provide a complete tuner for reception of high frequency signals. A first one of said compartments comprises a signal selecting compartment and includes tuning circuit means for selecting any one of a plurality of high frequency signals, such as those in the television signal bands. An input signal, selected in the signal selecting compartment, is applied to a variable capacitance diode mounted in a second chassis compartment. The second chassis compartment is constructed in accordance with the invention as described hereinabove.

The second chassis compartment functions as a parametric up-converter, operated in the sum mode, wherein the idler circuit cavity resonator is tuned to a frequency $f_i$ which is the sum of the frequencies $f_s$, the input signal frequency, and $f_p$, the pump oscillator signal frequency. The up-converter idler output signal developed in the second chassis compartment is applied to a third chassis compartment, which is operated to function in the manner of a down-converter, to derive an output signal having a frequency coincident with the intermediate frequency of signal wave receivers, such as television receivers.

The third chassis compartment is constructed similarly to the second chassis compartment and includes a pair of cavity resonators having a nonlinear resistive diode mixer mounted in an iris at their junction in a manner similar to the mounting of the variable capacitance diode in the second chassis compartment. One of the cavity resonators is fixedly tuned to the frequency $f_i$ of the idler circuit cavity resonator in the second chassis compartment, and is coupled thereto by means of an iris, so that idler signals are applied to the nonlinear resistive diode. The other cavity resonator in the third chassis compartment is fixed tuned to a frequency $f_o$ equal to the sum of the idler signal frequency $f_i$ and an intermediate frequency and is coupled to a local oscillator. The difference frequency signals, produced by the interaction of the idler and local oscillator signals in the nonlinear resistance of the diode mixer, is coupled from the diode mixer to provide the intermediate frequency output signal of the tuner.

Other embodiments of the invention will be described in detail subsequently. The novel features that are considered to be characteristic of this invention are set forth with particularity in the appended claims. The invention itself, however, both as to its organization and method of operation as well as additional object and advantages thereof will best be understood from the following description when read in conjunction with the accompanying drawing in which:

Figure 1:
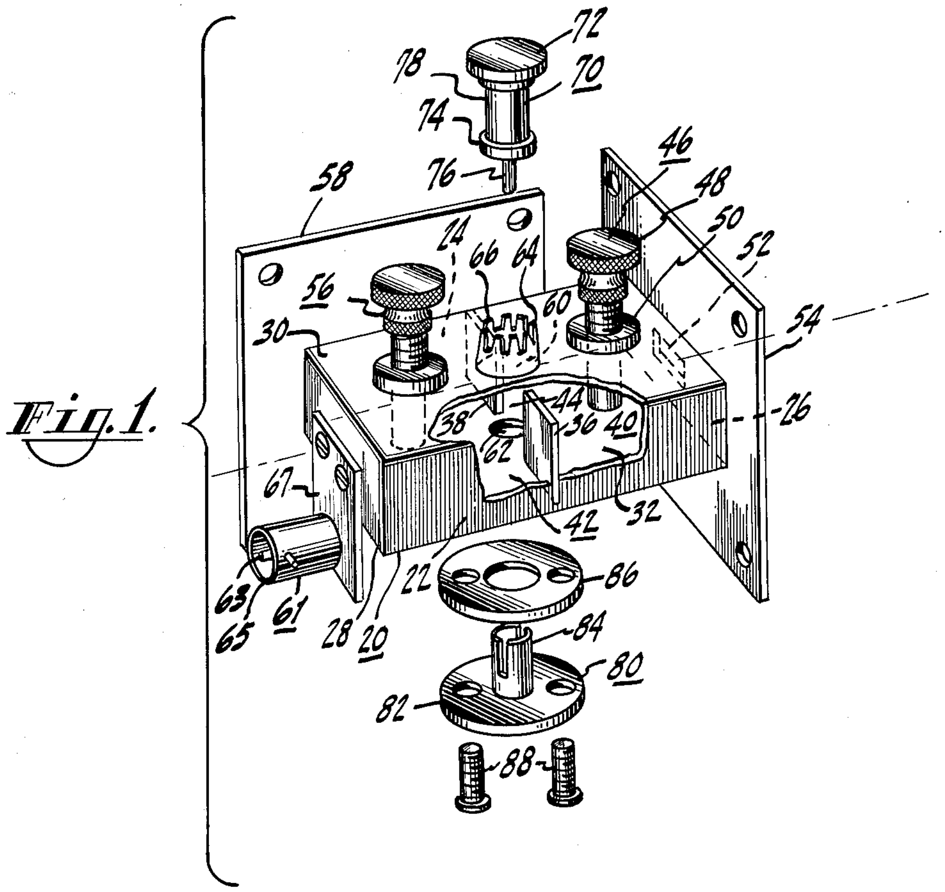
FIGURE 1 is a partially broken, and partially exploded, enlarged perspective view of a parametric converter chassis compartment in accordance with the invention.

Referring now to FIGURE 1, which is drawn enlarged for clarity, a frequency converter, in accordance with the invention, includes a rectangular chassis compartment 20 having sidewalls 22 and 24, endwalls 26 and 28, a top 30 and a bottom 32. The compartment 20 is formed of a conductive material, such as brass waveguide material. A septum or partition wall, made of similar conductive material, and which includes a pair of members or fins 36 and 38, is soldered within the conductive compartment 20 parallel to the endwalls 26 and 28 thereof to separate the compartment 20 into a first cavity resonator 40 and a second cavity resonator 42. The conductive members 36 and 38 define an iris 44 between the cavity resonators 40 and 42. The first cavity resonator 40 which may, for example, function as a frequency selective circuit for a pump oscillator (not shown), is provided with tuning means 46 for tuning to the frequency of a pump oscillator signal. The tuning means 46 includes a threaded tuning screw 48, made of a conductive material, which extends into the cavity resonator 40 through an opening at the geometrical center of the top of this resonator. The tuning screw 48 is supported by a nut 50 mounted in this opening. Pump oscillator signal energy is coupled into the cavity resonator 40 by means of an iris 52, shown dotted, which is centrally formed in the endwall 26 of the compartment 20. A waveguide flange 54 soldered to the endwall 26 provides the means for connecting to the pump oscillator. The flange 54 is formed with an opening, through which the endwall 26 fits, so that the endwall 26 and flange 54 are flush mounted with respect to each other.

Figure 2:
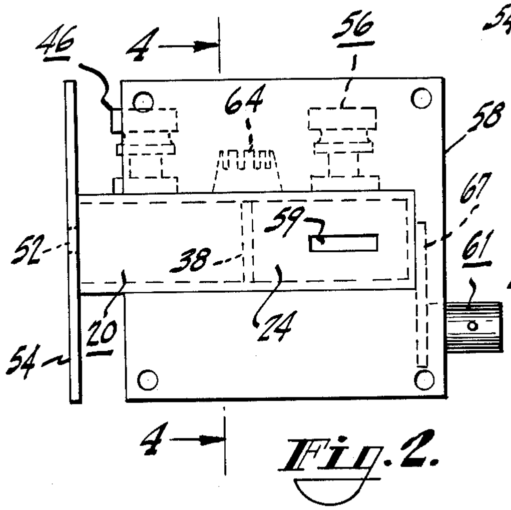
FIGURE 2 is a side view of the parametric converter chassis compartment of FIGURE 1.

The second cavity resonator 42, functions as an idler resonant circuit. The cavity resonator 42 includes tuning means 56 mounted similarly to the tuning means 46 of the cavity resonator 40. A waveguide flange 58, having a slot through which the sidewall 24 of the chassis compartment 29 fits, is soldered to the sidewall 24 so that they are flush mounted with respect to each other. An iris 59, which is not visible in FIGURE 1, but which is shown in FIGURE 2, is formed in the sidewall 26 of the cavity resonator 42 to provide output coupling from this cavity resonator. The flange 58 is also shown more fully in FIGURE 2.

A coaxial connector 61, having an inner conductor 63 and an outer conductor 65, is fastened to the outside of the compartment 20 by fastening the connector 61 into an opening in a support member 67 which, in turn, is screwed to the outside of the sidewall 28, as shown in FIGURE 1. The coaxial connector 61, as will be explained in more detail below, functions as a signal input connection for the parametric converter of FIGURE 1.

Means are provided for mounting a variable reactance device in the iris 44 formed at the junction of the resonators 40 and 42 by the conductive members 36 and 38. Such manner of mounting permits the variable reactance device to be coupled to both the cavity resonator 40 and 42 to function as the active element in the converter chassis.

To accomplish this mounting, the top 30 and the bottom 32 of the chassis compartment 20 have openings, 60 and 62 respectively, cut therethrough on a centerline coincident with the conductive members 36 and 38. An annular crown-like conductive support 64, having a multiple number of fingers 66, is mounted in the opening 60 by soldering to the top 30 of the compartment 20.

A nonlinear device such as a variable-capacitance diode 70, which may have a construction such as that shown in FIGURE 1, is mounted in the crown support 64. The casing of the diode 70 includes a metal cap 72, which makes electrical contact with one electrode, such as the anode, thereof. A metal base 74, having a cartridge like protrusion 76, makes electrical contact with the other electrode, the cathode, of the diode 70. The central portion 78 of the casing of the diode 70 is of an insulating material.

Figure 3:
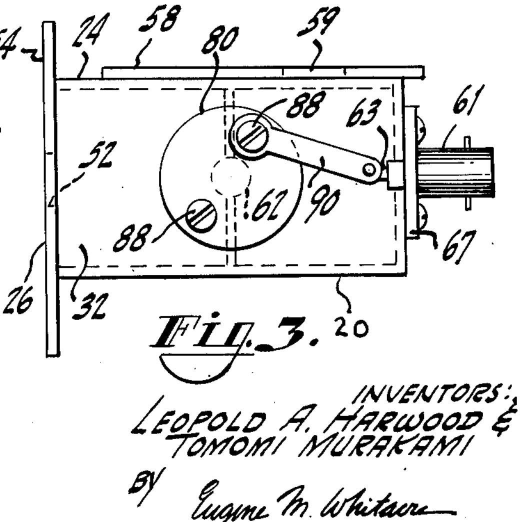
FIGURE 3 is a bottom view of the parametric converter chassis compartment of FIGURE 1.

As illustrated in FIGURE 1, the diode 70 is inserted into the annular crown support 64 so that the cartridge 76 end of the diode 70 extends downwardly into the chassis compartment 20 through the opening 60. The diode 70 is supported at the base cartridge 76 end thereof by a conductive holder 80. The holder 80 includes a disc 82 on which is fastened an upright slotted sleeve 84. An annular element 86, made of an insulating material such as, for example, Teflon, is fitted around the sleeve 84. The sleeve 84 is inserted through the opening 62 and both the holder 80 and element 86 are screwed to the outside of the bottom 32 of the compartment 20 by means of a pair of screws 88. The screws 88 are made of an insulating material such as nylon and the bottom 32 of the compartment 20 is tapped and threaded to receive them. When so mounted, the disc 82 of the conductive holder 80 completely covers the opening 62, as shown in FIGURE 3 which is a bottom view of the chassis compartment 20. The disc 82 functions as one plate of a capacitor, the other plate of which is the bottom 32 of the compartment 20. Also shown in FIGURE 3 is the manner of coupling the input signal connector 61 to the disc 82. One end of a soldering lug 90 is conductively connected to the disc 82 by means of the screw 88 while the other end of the soldering lug 90 is soldered to the inner conductor 63 of the connector 61, which protrudes through an opening in its support member 67. It is to be noted that these connections are completely on the outside of the compartment 20.

Figures 4, 5, 6, 7:
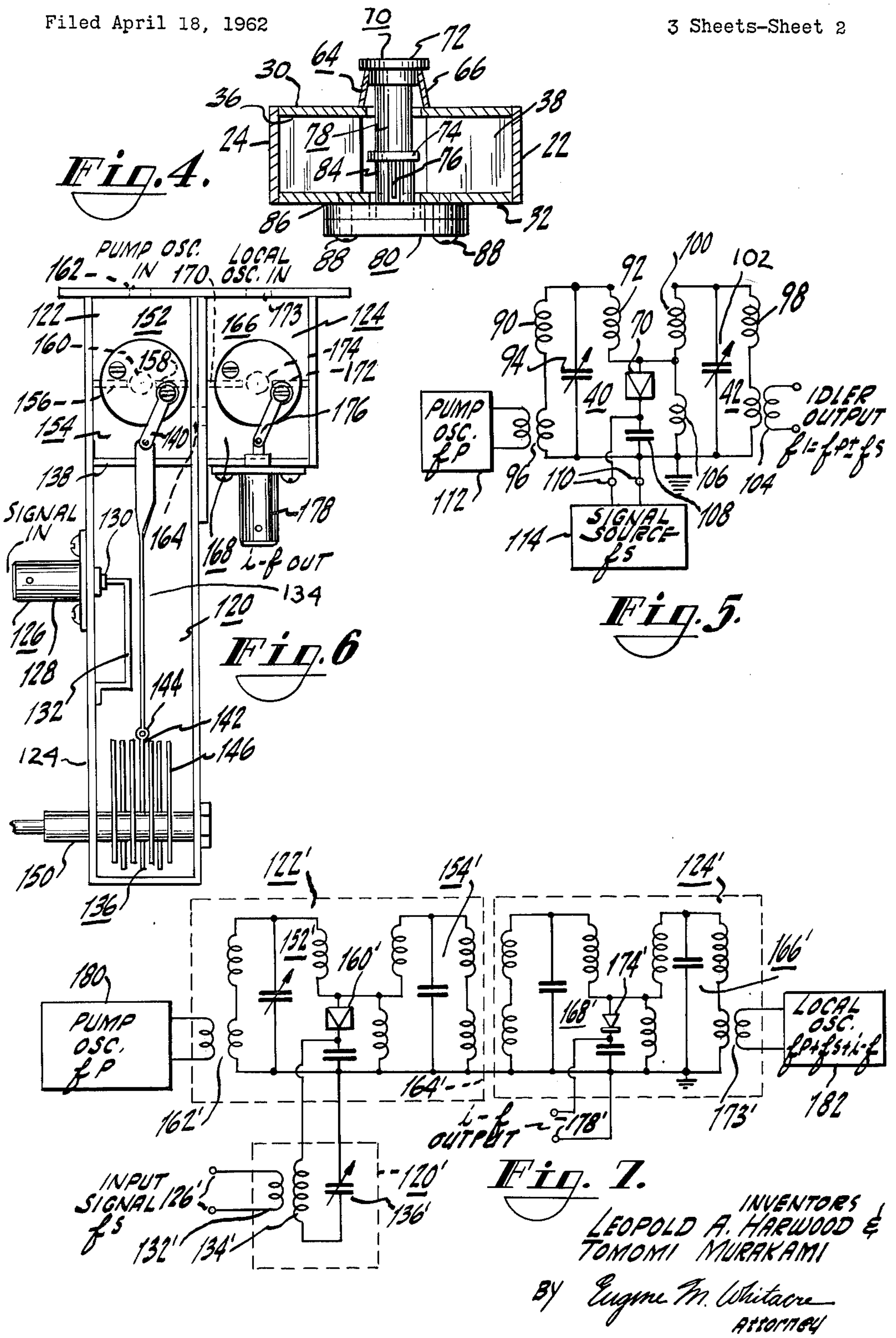
FIGURE 4 is an enlarged sectional view of the chassis compartment taken along lines 4—4 in FIGURE 2.
FIGURE 5 is an equivalent schematic circuit diagram of the parametric converter of FIGURE 1.
FIGURE 6 is a bottom view of a parametric tuner structure in accordance with the invention.
FIGURE 7 is an equivalent schematic circuit diagram of the parametric tuner shown in FIGURE 6.

To more clearly illustrate the mounting of the diode 70, reference is now made to FIGURE 4, which is an enlarged sectional view of the compartment 20 taken along the sectional lines 4—4 in FIGURE 2. In FIGURE 4, the tuning means 56, the flange 58, the connector 61 and the support 67 have been removed for greater clarity.

The diode 70 is inserted through the annular crown support 64 so that the metal cap 72 of the diode 70 is supported on the fingers 66 of the support 64. The fingers 66 may be bent inwardly to firmly support the diode 70 as well as make good electrical contact therewith. This also prevents any leakage of electromagnetic energy from the compartment 20. Diodes with other types of casings which require different supports may be utilized, but the one illustrated is preferred. The cartridge protrusion 76 of the metal base 74 of the diode 70 is inserted into the sleeve 84 of the holder 80. The slots in the sleeve 84 permit deformation of the sleeve 84 to make good electrical contact with the base 74 of the diode 70. The base 74 of the diode 70 is thereby insulated from the bottom 32 of the compartment 20 at frequencies at which the insulating element 86 exhibits a high capacitive reactance.

The conductive fins 36 and 38 approach closely to the diode 70 to provide an effective partition wall across the compartment 20. To provide such a partition wall to separate the compartment 20 into two cavity resonators, the length of the conductive members 36 and 38, as measured from the sidewalls 22 and 24 respectively toward the diode 70, should be such that the iris 44 does not exceed a quarter wavelength at the resonant frequencies of the cavity resonators 40 and 42.

A parametric converter chassis compartment which was constructed using 0.05 inch thick brass waveguide material had the following outside dimensions:

The sidewalls 22 and 24 were 1.59 inches by 0.5 inch;
The top 30 and bottom 32 were 1.59 inches by 1.0 inch;
The endwalls 26 and 28 were 1.0 inch by 0.5 inch;
The conductive members 36 and 38 were each 0.4 inch high and 0.3 inch long.

The chassis compartment 20 of FIGURE 1 is dimensioned to operate in the $TE_{10}$, or dominant, mode in which the electric flux lines extend from the bottom 32 to the top 30 of the compartment 20 and are parallel to the end and sidewalls thereof, while the magnetic flux lines form closed loops which are parallel to the top 30 and the bottom 32 thereof. The conductive members 36 and 38 are positioned within the compartment 20 and spaced from the endwalls 26 and 28 at a distance to provide two half-wave cavity resonators 40 and 42 with resonant frequencies on the order of 10,000 megacycles. In such cavity resonators, the electric field is greatest at the center of the cavity resonators 40 and 42, where the tuning means 46 and 56 are mounted, and diminishes near the side and endwalls thereof. The magnetic field however is a minimum in the vicinity of the tuning means 46 and 56 while increasing to a maximum at walls of these resonators. The tuning means 46 and 56 function as capacitive posts to alter the electric fields within the cavity resonators 40 and 42 to tune these cavities to different frequencies. The irises 52 and 59, as well as the iris 44 formed by the conductive members 36 and 38, function as inductive windows to provide coupling to the resonators.

Cavity resonators such as 40 and 42 are particularly suitable for use in parametric converters due to the high frequencies at which parametric converters are operated. At these high frequencies, the cavity resonators 40 and 42 are compact and inexpensive and thus readily adaptable for inclusion in signal wave receivers, such as television receivers. Cavity resonators such as 40 and 42 exhibit relatively high loaded Q's which, in conjunction with the relatively low coefficient of coupling, therebetween minimizes interaction between the signals in these cavity resonators. Furthermore even though presently available variable reactance devices, such as the diode 70, exhibit low Q's at the cavity resonant frequencies the diode 70 does not severely reduce the Q's of the cavity resonators 40 and 42 since the diode is mounted at the end of each cavity resonator at a position where the electric fields therein are a minimum and hence is loosely coupled to the cavities. The diode 70, is therefore properly coupled to both the resonators 40 and 42. Due to such mounting, the idler cavity resonator 42, when tuned to a resonant frequency of 10,000 megacycles, exhibited a loaded Q of 500 and a bandwidth of 20 megacycles. The coupling of the diode 70 to either of the cavity resonators 40 or 42 can be changed by locating the diode 70 at different positions in the iris 44 along the centerline of the compartment 20. Additionally, the iris 44 could be formed closer to one sidewall 22 or 24 than the other.

As an aid in explaining the operation of the parametric converter of FIGURE 1, an approximate equivalent schematic circuit diagram is illustrated in FIGURE 5. A cavity resonator may be considered to be a resonant tank circuit which includes a pair of inductors and a capacitor, all connected in parallel with each other. The forming of an inductive iris in the walls of a cavity resonator effectively adds a transformer coupling to the tank circuit. Thus, in FIGURE 5, the inductors 90 and 92 and the capacitor 94 comprise the cavity resonator 40, while the transformer 96 represents the iris 52 for this cavity. Similarly the inductors 98 and 100 and the capacitor 102 represent the cavity resonator 42, while the transformer 104 represents the iris 59 (shown in FIGURE 2) for this cavity. The inductor 106 represents the iris 44 formed between the cavity resonators 40 and 42. The diode 70 is connected in series with a capacitor 108, which is the schematic representation of the insulating element 86, across the inductor 106 (iris 44). The capacitors 94 and 102 are shown variable to represent the tuning means 46 and 56 in the cavity resonators 40 and 42 respectively. A pair of terminals 110 represents the coaxial connector 61.

A pump oscillator 112 is coupled to the cavity resonator 40 which functions as a frequency selective filter for the oscillator 112. The oscillator 112 may comprise any suitable high frequency oscillator such as a klystron or tunnel diode oscillator. The amount of coupling between the pump oscillator 112 and the cavity resonator 40, and hence the size of the iris 52, is dependent upon the oscillatory power available from the oscillator 112 and the impedance thereof and is therefore selected to suit individual design considerations. Similarly the load on the idler resonant circuit 42 would determine the size of the iris 59.

A signal source 114, which may for example comprise an antenna, is coupled across the capacitor 108 at the terminals 110. The capacitor 108, and hence the thickness and composition of the insulating element 86, is selected to exhibit a high capacitive reactance at the frequency $f_s$ of an input signal to develop an appreciable signal amplitude for application to the diode 70. Oscillations at a frequency $f_p$ are applied to the diode 70 from the pump oscillator 112. The cavity resonator 40 is tuned to the frequency $f_p$ of the pump oscillator 112 by means of the tuning capacitor 94 and this frequency is selected to be higher than the frequency $f_s$ of the input signal. At the frequency $f_p$, as well as the frequency $f_i$, the capacitive reactance of the capacitor 108 is essentially a short circuit so that substantially the entire output of the pump oscillator 112 is applied to the diode 70 and no idler signals are developed across the capacitor 108. Additionally since the cavity resonators 40 and 42 exhibit essentially a short circuit to input signals at the frequency $f_s$, the signal source 114 is effectively decoupled from and does not load these resonators. Furthermore since the capacitor 108 is essentially a short circuit at the pump oscillator and idler signal frequencies, the pump oscillator and idler signals are decoupled from the signal source 114.

The mixing of the input signal at a frequency $f_s$ and the pump oscillator signal at a frequency $f_p$ in the time-varying capacitance of the diode 70 produces mixed output signals of frequencies corresponding to the sum and difference of the frequencies $f_s$ and $f_p$. The idler cavity resonator 42 may be tuned to either the sum or the difference of these frequencies to develop an idler output signal.

If the idler cavity resonator 42 is tuned to the difference frequency, an effective negative resistance is presented to the signal source 114. Although exeedingly high conversion gains are obtained in such operation instability, as evidenced by spurious oscillations, can occur. Such instability can readily occur if the signal source 114 is an antenna circuit which is subject to impedance variations due to wind, rain, and other environmental and man made conditions. At high frequencies, an isolator could be inserted between the signal source 114 and the terminals 110 to prevent such instability but at lower frequencies, such as in the television signal bands, the usual isolators become impractical for large percentage bandwidths. To avoid instability problems, the idler cavity resonator 42 is operated in the sum mode and therefore tuned to the sum of the input signal and pump oscillator frequencies. Such operation is uniformly stable.

Thus the frequency converter is simple and compact in construction and exhibits substantial isolation between a source of signals, a pump oscillator and an output circuit without the necessity of including expensive and bulky isolating devices.

Referring now to FIGURE 6, a bottom view, with the bottom cover plate removed, of a parametric tuner is illustrated. The parametric tuner comprises a chassis made of a conductive material and having a plurality of compartments 120, 122 and 124. The first compartment 120 functions as signal selecting circuit for tuning to signals in high frequency bands, such as the television signal bands. The compartment 122 functions as a parametric up-converter, while the compartment 124 functions as a mixer compartment to down-convert idler signals developed in the compartment 122 to the intermediate frequency of a television receiver.

The signal selecting compartment 120 includes a coaxial cable connector 126 having its outer conducting shield 128 fastened to a sidewall 129 of this compartment while the inner conductor 130 is inserted through an opening in the sidewall 129 and connected to one end of a conductive loop or coupler 132. The other end of the coupler 132 is soldered to the sidewall 129. A transmission line conductor, or inductor, 134 is positioned close to, but spaced from, the coupler 132 to receive signal energy therefrom. The inductor 134 is supported at one end by means of a variable capacitor 136. The other end of the inductor 134 is folded and inserted through an opening in the endwall 138 and soldered to a connector or soldering lug 140 to apply input signals to the parametric up-converter compartment 122. The variable capacitor 136 may, for example, comprise a multiplicity of stator plates 142, supported on an insulating post 144, and adapted to mesh with a multiplicity of rotor plates 146 mounted on a rotatable tuning shaft 150. The shaft 150, which is supported by the sidewalls of the compartment 120, extends through the sidewall 129 to the exterior of the parametric tuner to permit rotation thereof to tune the tuner over a range of high frequencies.

Signals selected in the signal selecting compartment 120 are up-converted in the parametric up-converter compartment 122. The internal construction of the up-converter compartment 122 is identical to the parametric converter shown in FIGURE 1. The up-converter compartment 122 includes a pair of cavity resonators 152 and 154 formed by a pair of conductive members 156 and 158, shown dotted. A variable capacitance diode 160, also shown dotted is mounted at the junction of the cavity resonators 152 and 154 in an iris formed by the conductive members 156 and 158.

The cavity resonator 152 functions as the resonant filter circuit for a pump oscillator, not shown, and pump oscillatory energy is coupled to the resonator 152 through an iris 162. The cavity resonator 154 functions as an idler resonant circuit and idler output signals are coupled to the compartment 124 through an iris 164.

The down-converter compartment 124 is constructed similarly to the compartment 122 and also includes a pair of cavity resonators 166 and 168 formed by a pair of conductive members 170 and 172, shown dotted. A nonlinear resistive diode 174, also dotted, is mounted at the junction of the cavity resonators 166 and 168 in an iris formed by the conductive members 170 and 172. The cavity resonator 168 is tuned to the up-converted idler output signals, which signals are applied thereto through the iris 164. Thus the cavity resonators 154 and 168 function as a double-tuned idler resonant circuit. The cavity resonator 166 is tuned to the frequency of the local oscillations from a local oscillator, not shown, coupled thereto through an iris 173. Mixed output signals, developed in the mixer diode 174, are coupled by means of a soldering lug 176 to a coaxial output connector 178.

Referring now to FIGURE 7, an equivalent schematic circuit diagram of the tuner of FIGURE 6 is shown. As an aid in tracing the circuit, the same reference numerals with primes added have been given to circuit components which are equivalent to the structural components shown in FIGURE 6. The identity of these circuit components not labled in FIGURE 7 may be ascertained by referring to FIGURE 5, inasmuch as the cavity resonators utilized in these different embodiments of the invention are substantially identical.

Input signals of a frequency $f_s$, which may be derived from an antenna coupled to the input terminals 126′ are selected in the signal selecting resonant circuit 120′. Pump oscillatory signals of a frequency $f_p$, which is selected to be substantially higher than the frequency $f_s$, are applied to frequency selective resonant circuit 152′ of the pump oscillator 180. Both the input and pump oscillator signals are applied to the variable capacitance diode 160′ in a manner identical to that described in connection with FIGURE 5. The interaction of the input and pump oscillator signals in the diode 160′ produces an amplified idler output signal which is developed in the double-tuned idler resonant circuits 154′ and 168′. The idler resonant circuits 154′ and 168′ are fixedly tuned to a frequency $f_i$ which is the sum of the frequencies of the input and pump oscillator signals, i.e. $f_i=f_s+f_p$. Thus the parametric up-converter 122′ is operated in the sum mode and is therefore stable. The idler resonant circuits 154′ and 168′ may for example be fixedly tuned to an idler frequency of 9500 megacycles. Thus, with the signal selection circuit 120′ tuned to select a signal in the television signal band of say 500 megacycles, the pump oscillator resonant circuit 152′ is tuned to 9000 megacycles. As the signal selecting circuit 120′ is tuned by the variable capacitor 136′ to television signals at higher frequencies, the pump oscillator frequency selective circuit 152′ is tuned to lower frequencies by means of the variable capacitor 181 (tuning screw), and vice versa.

The double tuned idler resonant circuits 154′ and 168′ are selected to exhibit a bandpass characteristic of approximately 20 megacycles because of possible pump oscillator drift and the iris 164 therebetween is made small to provide loose coupling. With the double tuning of the idler resonant circuits, the selectivity of these circuits is made sufficiently sharp so as to reject difference frequency signals which are also created in the diode 160′. Therefore difference mode operation even with input signals in the VHF television signal bands is avoided and the parametric tuner is stable.

The idler output signal at the frequency $(f_p+f_s)$ is applied to the nonlinear resistive diode mixer 174′ in conjunction with a local oscillator signal at a frequency $f_o$ derived from a local oscillator 182. The local oscillator frequency $f_o$ is selected to be equal to the sum of the input and pump oscillator signal frequency and the intermediate frequency of a television receiver. The local oscillator frequency selective circuit 166′ is fixedly tuned to the frequency $f_o$ which in the example given is 9545 megacycles. Both the local oscillator and idler signals are applied to the nonlinear resistive diode mixer 174′. The diode 174′ is mounted at the junction of the local oscillator and idler circuit cavity resonators 166′ and 168′ in a manner identical to that shown in FIGURE 4 for the parametric converter of FIGURE 1. The diode 174′ mixes the local oscillator and idler signals and an intermediate frequency signal of 45 megacycles is derived from the output terminals 178′ by coupling a tuned I.-F. amplifier thereto. The resistive losses introduced in the down-converter compartment 124′ by the diode 174′ are more than compensated for by the conversion gain obtained in the parametric up-converter compartment 122′ by selecting a pump oscillator signal frequency $f_p$ much greater than the input signal frequency $f_s$.

Thus, a parametric tuner for tuning to signals, which may for example be television signals, is provided. The tuner is stable and exhibits a conversion gain as well as a low noise figure. The signal selecting and pump oscillator circuits are effectively isolated from each other and the idler circuit. Thus the signal selecting and pump oscillator circuits may be tuned over a range of frequencies without detuning the idler circuit cavity resonator. Thus a high conversion gain is exhibited over the entire tuning range of the parametric tuner without the necessity of introducing bulky and expensive isolating devices to provide such isolation.

Figure 8:
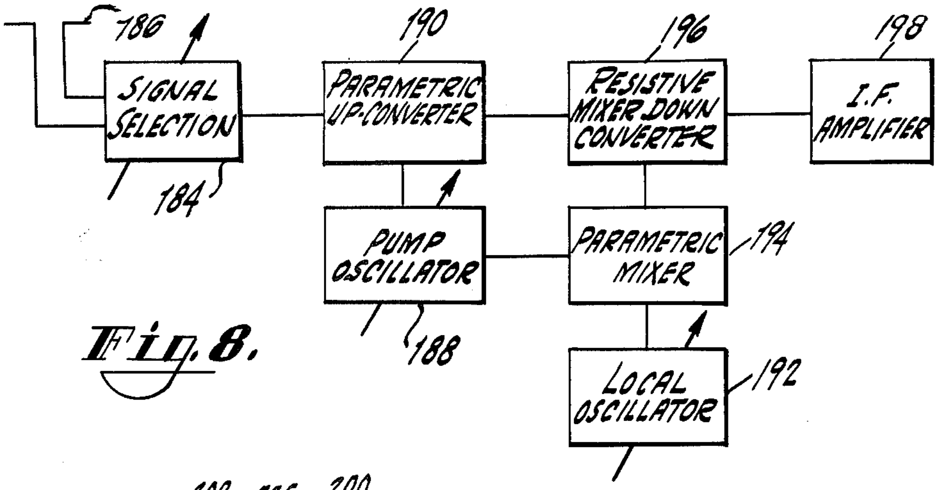
FIGURE 8 is a block diagram of another embodiment of a parametric tuner in accordance with the invention.

Since the parametric tuner of FIGURE 7 utilizes a pump oscillator 180 and a local oscillator 182, which both oscillate at frequencies on the order of 9000 megacycles, oscillator drift may cause problems. A parametric tuner which avoids this problem by automatically compensating for oscillator drift is shown in block form in FIGURE 8. A tunable signal selecting circuit 184, which is identical to the signal selecting compartment 120 of FIGURE 6, is coupled to select signals intercepted by an antenna 186. For example the signal selection circuit 184 may be tuned to a frequency $f_s$ of 500 megacycles. The signal selecting circuit 184, as well as a tunable pump oscillator 188, are coupled to a parametric up-converter 190 which is operated in the sum mode. The parametric up-converter 190 is identical to that shown in FIGURE 1 and operates in an identical manner. Thus, with a pump oscillator signal having a frequency $f_p$ of 9000 megacycles, the idler output resonant cavity of the parametric up-converter 190 is fixed tuned to a frequency $f_i$ of 9500 megacycles while the pump oscillator resonant cavity is tuned along with the pump oscillator 188.

The pump oscillator 188, as well as a variable local oscillator 192, are coupled to a mixer circuit 194. The mixer circuit 194 is shown as a parametric mixer i.e. a mixer including a variable reactance device as the nonlinear element thereof, to reduce losses in the tuner but the nonlinear device could also be a resistive diode. The parametric mixer 194 is operated in the sum mode and is identical to the parametric converter of FIGURE 1 and the local oscillatory signals from the local oscillator 192 are coupled to the mixer 194 in a manner identical to the coupling of the input signals to the converter of FIGURE 1. The local oscillator 192 is tuned to a frequency $f_o$ which equals the sum of the input signal frequency $f_s$ and the intermediate frequency I–F of a television receiver. Thus in the example selected the local oscillator 192 is tuned to a frequency $f_o$ of 545 megacycles. The idler output signal resonant circuit of the parametric mixer 194 is fixed tuned to a frequency which is the sum of the frequencies of the pump and local oscillator frequencies, or a frequency $f'_o$ $(f'_o=f_p+f_s+\text{I–F})$ of 9545 megacycles.

The output signals of the parametric up-converter 190 and the mixer 194 are applied to a resistive mixer down-converter 196 which is identical to the down-converter compartment 124 of FIGURE 6. The resistive down-converter 196 mixes the applied signals of frequencies 9545 and 9500 to develop a difference or intermediate frequency signal of 45 megacycles. An intermediate frequency amplifier 198, fixedly tuned to this intermediate frequency, is coupled to the down-converter 196 to receive and amplify the intermediate frequency signals.

Automatic compensation for pump oscillator 188 drift is provided in this embodiment of the invention. If the pump oscillator 188 drifts and deviates from its selected frequency $f_p$ by an amount $\Delta f$, the frequency of the up-converted idler signal from the up-converter 190 also deviates by an amount $\Delta f$. Additionally, frequency of the output signal of the mixer 194 also deviates by the same amount because the pump oscillator 188 is also coupled to this mixer. Any further drift in the output signal of the parametric mixer 194 due to drift in the lower frequency local oscillator 192 may be avoided by utilizing any suitable technique to prevent drift at these frequencies.

The differential error frequency $\Delta f$ by being included in both signal inputs to the down-converter 196 tends to cancel in this circuit, thereby producing a substantially constant output signal of the intermediate frequency, I–F. Thus in compensation for drift a high frequency pump oscillator is provided.

Figure 9:
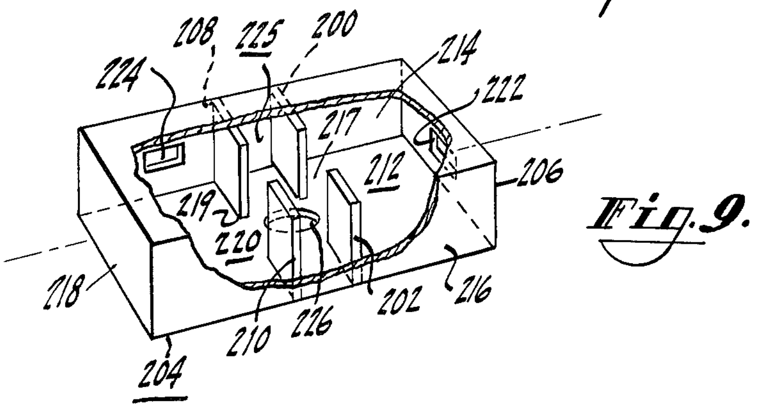
FIGURE 9 is a partially broken perspective view of another embodiment of a parametric converter chassis compartment in accordance with the invention.

Referring now to FIGURE 9, there is shown a partially broken perspective view of another parametric converter embodying the invention. The parametric converter of FIGURE 9 is substantially identical to that of FIGURE 1 with the exception that a separate individual cavity is formed for mounting a variable capacitance diode. This is accomplished by soldering a first pair of conductive members 200 and 202 on the inside of a conductive chassis compartment 204 parallel to the endwall 206 thereof. A second pair of conductive members 208 and 210 are also mounted within the compartment 204 spaced from, but parallel to, the first pair of conductive members 200 and 202 respectively.

The conductive members 200 and 202 in conjunction with the endwall 206 define within the compartment 204 a first half-wave cavity resonator 212. The conductive members 200 and 202, as measured from the sidewalls 214 and 216 respectively to the center line of the compartment 204, are made sufficiently long to define an iris 217 therebetween which is less than a quarter wavelength opening, and the spacing between the endwall 206 and the conductive members 200 and 202 is made a half wavelength at the resonant frequency of the cavity resonator 212. The conductive members 208 and 210 are made sufficiently long to define an iris 219 therebetween which also is less than a quarter wavelength. Similarly the conductive members 208 and 210 are spaced from the endwall 218 to define a second half-wave cavity resonator 220. The compartment 204 is otherwise dimensioned to operate in the $TE_{10}$ dominant mode. An iris 222 is centrally formed in the endwall 206 to provide coupling from a pump oscillator, not shown, to the cavity resonator 121. An iris 224 is also formed in the sidewall 214 of the cavity resonator 220 to couple an output idler signal from this cavity, which functions as an idler signal resonant circuit. Although not shown, tuning means such as the means 46 and 56 of FIGURE 1, are also provided to tune the cavity resonators 212 and 220 to the frequencies of a pump oscillator signal $f_p$ and an idler signal $f_i$ respectively.

A cavity 224, formed between the first and second pair of conductive members functions as a separate cavity for mounting a variable capacitance diode. Thus, although not shown, this cavity 224 of FIGURE 9 would incorporate a variable capacitance diode and mounting means therefor, such as that shown in FIGURE 1. This includes a crown support 64 mounted on top of the cavity 224, and a base 80, insulating element 86 and screws 88 mounted at the opening 226 on the bottom of the cavity 224. Additionally a signal input connector, as well as supporting flanges, such as the components 61, 54 and 58 respectively of FIGURE 1 would also be included in the converter of FIGURE 9.

The inclusion of a cavity 224 in the embodiment of FIGURE 9 and the mounting of a variable capacitance diode therein provides a greater degree of isolation between the two cavity resonators of the compartment 204 than is provided by a single partition wall as in the embodiment shown in FIGURE 1.

Figure 10:
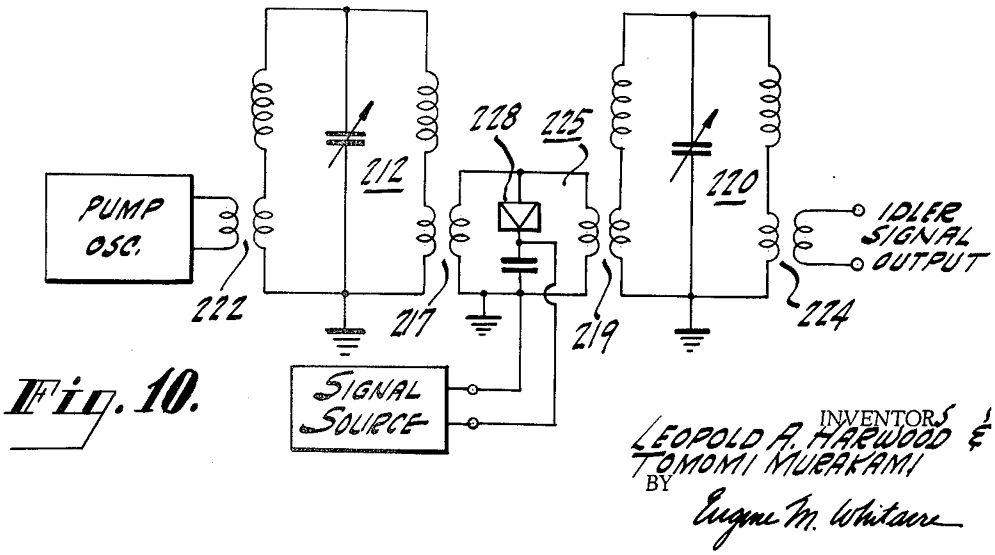
FIGURE 10 is an equivalent schematic circuit diagram of the parametric converter of FIGURE 9.

This may be seen by referring to FIGURE 10 which is an approximate equivalent schematic circuit diagram of the parametric converter of FIGURE 9. Reference numerals which are identical to FIGURE 9 have been given to corresponding circuit components in FIGURE 10.

A variable capacitance diode 228 when mounted in the cavity 224 causes the cavity 224 to function as an untuned circuit due to the fact that the low impedance exhibited by the diode 228 reduces the Q of the cavity 224. The diode 228 is inductively coupled to the pump oscillator cavity resonator 212 through the iris 217 and to the idler circuit cavity resonator 220 through the iris 219. The diode 228 may be more closely coupled to one, or the other, of the cavity resonators 212 and 220 by making the irises 217 and 219 different in dimensions, or mounting the diode closer to one of these irises. The cavity resonators 212 and 220 are not directly coupled to each other because of the untuned cavity 224. The high Q's exhibited by the resonators 212 and 220 and the different frequencies to which they are tuned permit little coupling therebetween due to current flow through the diode 228.

What is claimed is:

1. A parametric frequency converter comprising in combination:

a chassis compartment made of conductive material;

a pair of conductive members mounted within said compartment to separate said compartment into first and second cavity resonators;

said conductive members defining an iris between said first and second cavity resonators;

a variable capacitance diode having a pair of electrodes;

means for mounting said diode in said iris within said compartment to be coupled to both said first and second cavity resonators;

said mounting means including an annular support mounted in an opening in said compartment at the top of said iris and through which said diode is inserted and supported so that one of the electrodes of said diode makes electrical contact with the top of said compartment;

capacitive means;

support means for supporting said diode so that the other electrode of said diode makes electrical contact with the bottom of said compartment through said capacitive means;

means for applying an input signal of a frequency $f_s$ across said capacitive means;

said capacitive means exhibiting a substantial reactance at the frequency $f_s$;

a pump oscillator coupled to said first cavity resonator to apply thereto pump oscillator signals of a frequency $f_p$ much higher than the frequency $f_s$;

means for tuning said first cavity resonator to the frequency $f_p$ of said pump oscillator signals;

means for tuning said second cavity resonator to a frequency $f_i$ substantially equal to the sum of the frequencies $f_s$ and $f_p$; and means for coupling an idler output signal at the frequency $f_i$ from the second cavity resonator, which idler signal is produced by the interaction of the input and pump oscillator signals in said diode.

2. A parametric frequency converter comprising in combination:

a chassis compartment made of conductive material;

a conductive partition mounted within said compartment to separate said compartment into a first cavity resonator, resonant at a frequency $f_p$ of a pump oscillator signal, and a second cavity resonator, resonant at a frequency $f_i$ of an idler signal;

said conductive partition mounted so as to define an iris between said first and second cavity resonators;

a conductive disc;

means including an annular insulating member for mounting said disc on the outside of said compartment to cover an opening in said compartment at the bottom of said iris;

a nonlinear variable capacitance diode having a pair of electrodes;

means for mounting said diode in said iris so that one of said electrodes makes electrical contact with the top of said compartment and the other of said electrodes is coupled through the opening in said compartment at the bottom of said iris to make electrical contact with said conductive disc;

said conductive disc and said compartment exhibiting therebetween a substantial capacitive reactance at a frequency $f_s$ of an applied input signal and a small capacitive reactance at the frequencies $f_p$ and $f_i$;

means for applying said input signal across said capacitive reactance;
means defining an aperture in said first cavity resonator for coupling pump oscillator signals into said first cavity resonator; and
means defining an aperture in said second cavity resonator for coupling therefrom output idler signals at the frequency $f_i$ produced by the interaction of said input and pump oscillator signals in the nonlinear capacitance of said diode.

3. A parametric frequency converter comprising in combination:
a chassis compartment made of conductive material;
first and second conductive partitions mounted within said compartment to separate said compartment into a first cavity resonator, resonant at the frequency $f_p$ of a pump oscillator signal, a second cavity resonator resonant at the frequency $f_i$ of an idler signal, and a third cavity between said first and second cavity resonators;
said first and second conductive partitions mounted so as to define a first iris between said first cavity resonator and said third cavity, and a second iris between said second cavity resonator and said third cavity;
a conductive disc;
means including an annular insulating member for mounting said disc on the outside of said compartment to cover an opening at the bottom of said third cavity;
said conductive disc and said compartment exhibiting therebetween a substantial capacitive reactance at a frequency $f_s$ of an applied input signal and a small capacitive reactance at the frequencies $f_p$ and $f_i$;
means for applying said input signal across said capacitive reactance;
a nonlinear variable capacitance diode having a pair of electrodes;
means for mounting said diode in said third cavity so that one of said electrodes is direct current conductivity connected to the top of said compartment and the other of said electrodes is coupled through the opening in said compartment at the bottom of said third cavity to make electrical contact with said conductive disc to be capacitively coupled to the bottom of said compartment;
means defining an aperture in said first cavity resonator for applying pump oscillator signals to said first cavity resonator; and
means defining an aperture in said second cavity resonator for coupling therefrom output idler signals at the frequency $f_i$ produced by the interaction of said input and pump oscillator signals in the nonlinear capacitance of said diode.

4. A parametric tuner comprising in combination:
a conductive chassis member having a plurality of compartments including:
a signal selecting compartment including:
input signal means mounted to couple a source of signals to said signal selecting compartment; and
variable resonant circuit means mounted within said signal selecting compartment and coupled to said input signal means to select any one of a plurality of input signals at a frequency $f_s$;
a parametric up-converter compartment including:
a conductive partition mounted within said up-converter compartment to separate said compartment into a first cavity resonator, resonant at a frequency $f_p$ of a pump oscillator signal, and a second cavity resonator, resonant at a frequency $f_i$ of an idler signal;
said conductive partition mounted so as to define a first iris between said first and second cavity resonators;
a first conductive disc;
means including an annular insulating member for mounting said first conductive disc on the outside of said up-converter compartment to cover an opening in said compartment at the bottom of said first iris;
a nonlinear variable capacitance diode having a pair of electrodes;
means for mounting said diode in said first iris so that one of said electrodes makes electrical contact with the top of said up-converter compartment and the other of said electrodes is coupled through the opening in said up-converter compartment at the bottom of said iris to make electrical contact with said conductive disc;
means for coupling said input signals from said resonant circuit means between said conductive disc and said chassis to apply input signals to said variable capacitance diode;
said conductive disc and said compartment exhibiting therebetween a substantial capacitive reactance at the frequency $f_s$ of an applied input signal;
means for coupling said first cavity resonator to a variable pump oscillator;
means for tuning said first cavity resonator to a frequency $f_p$ of a pump oscillator signal, substantially higher than the frequency $f_s$ of an applied input signal;
said second cavity resonator fixedly tuned to substantially the sum of the frequencies $f_p$ and $f_s$ to develop idler output signals produced by the interaction of said input and pump oscillator signals in the nonlinear capacitance of said diode; and
a down-converter compartment including,
a conductive partition mounted within said down-converter compartment to separate said down-converter compartment into a third cavity resonator, resonant at said idler signal output frequency $f_i$, and a fourth cavity resonator, resonant at a local oscillator signal frequency, $f_o$;
said conductive partition mounted so as to define a second iris between said third and fourth cavity resonators;
a second conductive disc;
means including an annular insulating member for mounting said second conductive disc on the outside of said down-converter compartment to cover an opening in said down-converter compartment at the bottom of said second iris;
a nonlinear resistive diode having a pair of electrodes;
means for mounting said nonlinear diode in said second iris so that one of said electrodes makes electrical contact with the top of said down-converter compartment and the other of said electrodes is coupled through the opening in said down-converter compartment at the bottom of said second iris to make electrical contact with said conductive disc;
means for coupling said third cavity resonator to said second cavity resonator to apply idler signals to said nonlinear diode;
means for coupling a local oscillator to said fourth cavity resonator to apply local oscillatory signals to said nonlinear diode; and means coupled to said conductive disc for deriving intermediate frequency output signals produced by the interaction of said idler signals and said local oscillator signals in the nonlinear resistance of said resistive diode.

5. A parametric tuner comprising in combination:

first and second chassis compartments made of conductive material; each of said first and second chassis compartments including respectively:

means mounted within the compartment to provide first and second cavity resonators and to define an iris within said compartment, a variable capacitance diode having a pair of electrodes, means mounted in an opening at the bottom of the compartment for mounting said diode in said iris, and capacitive means, said diode being coupled to said chassis compartment directly at one of said pair of electrodes and through said capacitive means at the other of said pair of electrodes;

said first cavity resonators of said first and second chassis compartments being respectively resonant at a pump oscillator frequency $f_p$ and at a local oscillator frequency $f_o$, each of said second cavity resonators of said first and second compartments being resonant at an idler signal frequency $f_i$, means for applying a pump oscillator signal having a frequency $f_p$ to said first cavity resonator in said first chassis compartment;

means for applying a local oscillator signal having a frequency $f_o$ to said first cavity resonator in said second chassis compartment;

means coupling said second cavity resonator of said first and second chassis compartments to each other to provide a double tuned idler resonant circuit;

means coupled across said capacitive means in said first chassis compartment for applying input signals having a frequency $f_s$; and means coupled across said capacitive means in said second chassis compartment for deriving output signals having a frequency $f_i$.

References Cited by the Examiner

UNITED STATES PATENTS

| | | | |
|---|---|---|---|
| 2,962,586 | 11/1960 | Maurer | 325—445 |
| 3,048,783 | 8/1962 | Warren et al. | 330—4.9 X |

FOREIGN PATENTS

| | | |
|---|---|---|
| 1,087,646 | 8/1960 | Germany. |

OTHER REFERENCES

Troetschel and Hever: A Parametric Amplifier for 1296 mc., in ST, January 1961, pp. 13–19.

Heffner and Kotzebue: Experimental Characteristics of a Microwave Parametric Amplifier Using a Semiconductor Diode, in Proc. IRE, June 1958, p. 1301.

ROBERT H. ROSE, *Primary Examiner.*

DAVID G. REDINBAUGH, *Examiner.*